United States Patent
Ke (10) Patent No.: US 9,913,533 B1
(45) Date of Patent: Mar. 13, 2018

(54) FOLDABLE SHELF

(71) Applicant: Chia-Nan Ke, Changhua (TW)

(72) Inventor: Chia-Nan Ke, Changhua (TW)

(*) Notice: Subject to any disclaimer, the term of this patent is extended or adjusted under 35 U.S.C. 154(b) by 0 days.

(21) Appl. No.: 15/635,088

(22) Filed: Jun. 27, 2017

(51) Int. Cl.
| | |
|---|---|
| *A47B 43/00* | (2006.01) |
| *A47B 96/02* | (2006.01) |
| *A47B 47/00* | (2006.01) |
| *B62B 3/02* | (2006.01) |
| *B62B 3/00* | (2006.01) |
| *B62B 5/06* | (2006.01) |

(52) U.S. Cl.
CPC .......... *A47B 43/00* (2013.01); *A47B 47/0083* (2013.01); *A47B 96/021* (2013.01); *B62B 3/002* (2013.01); *B62B 3/02* (2013.01); *B62B 5/06* (2013.01); *B62B 2205/33* (2013.01)

(58) Field of Classification Search
CPC ... A47B 43/00; A47B 47/0083; A47B 96/021; A47B 31/04; A47B 55/02; B62B 3/002; B62B 3/02; B62B 2205/33; B62B 5/06; A47F 5/10
See application file for complete search history.

(56) References Cited

U.S. PATENT DOCUMENTS

| | | | | |
|---|---|---|---|---|
| 3,093,247 | A * | 6/1963 | Erickson | A47B 31/04 108/188 |
| 4,740,010 | A * | 4/1988 | Moskovitz | A47B 31/04 108/170 |
| 5,806,864 | A * | 9/1998 | Zielinski | B62B 3/02 280/42 |
| 5,915,723 | A * | 6/1999 | Austin | B62B 3/02 280/43 |
| 6,598,753 | B2 * | 7/2003 | Ming | A47G 25/12 211/104 |
| 9,226,574 | B1 * | 1/2016 | Chen | A47B 43/00 |
| 2004/0226491 | A1 * | 11/2004 | Chen | A47B 3/002 108/124 |

* cited by examiner

*Primary Examiner* — Ko H Chan
(74) *Attorney, Agent, or Firm* — Che-Yang Chen; Law Offices of Scott Warmuth (57) ABSTRACT

A foldable shelf may comprise a main body having two vertical connecting rods respectively located at middle portions of two sides of the main body at corresponding positions, and four vertical legs are respectively assembled at four corners of the main body to support at least two pairs of rotatable shelf boards therebetween. Each of the connecting rods has a connecting member coupled on an inner edge thereof, and each of the connecting members is pivotally connected to a V-shaped connecting rib. The foldable shelf further comprises two operating ribs at the top portion thereof. A user can pull the operating ribs upwardly to drive the pairs of the shelf boards to be folded together and drive the legs at two lateral sides of the main body to move toward each other, thus completing the folding process easily and quickly.

3 Claims, 8 Drawing Sheets

FOLDABLE SHELF

FIELD OF THE INVENTION

The present invention relates to a shelf, and more particularly to a foldable shelf.

BACKGROUND OF THE INVENTION

Nowadays, a variety of shelves are sold in the market, and most of them are the stationary type which has a fixed frame after assembled. Usually, the manufacturer warps the components of shelf in separated small packages, which is easy for transportation, and after purchasing, a user can assemble the components into a fixed shelf through fasteners, screws and nuts. However, although the stationary type of shelf can be assembled and disassembled, it still needs to take user's time on assembly or disassembly process and may be inconvenient for user to storage when the shelf is temporarily not used. Therefore, there remains a need for a new and improved design for a foldable shelf to overcome the problems presented above.

SUMMARY OF THE INVENTION

The present invention provides a foldable shelf which comprises a main body. The main body has two vertical connecting rods respectively located at middle portions of a front side and a rear side of the main body at corresponding positions, and each of the connecting rods has a connecting member coupled on an inner edge thereof. Each of the connecting members has two vertical elongated holes which are configured to respectively cooperate with two lock units, wherein the two lock units are configured to be secured on the inner edge of the connecting rod, and the two elongated holes are adapted to respectively couple with the two lock units, thereby enabling the connecting member to have vertical movements along the inner edge of the connecting rod. Furthermore, each of the connecting members is pivotally connected to a V-shaped connecting rib, and at least two horizontal connecting pieces are respectively connected to an outer edge of the connecting rod. Also, each of the connecting pieces is connected to the connecting rod through a middle portion thereof to evenly position two lateral ends thereof at two lateral sides of the connecting rod. The two connecting pieces at the same vertical height on the two different connecting rods are cooperated to assemble a pair of horizontal shelf boards therebetween symmetrically at the two lateral sides of the connecting rods, and each of the two shelf boards pivotally coupled with the two connecting pieces at two lateral edges thereof is axially rotatable between the two connecting pieces. Each of the two V-shaped connecting ribs is connected to the two uppermost shelf boards respectively at two ends thereof. Moreover, each of the connecting pieces has two locating ribs formed at a top portion thereof, and each of the two uppermost connecting pieces on the two connecting rods further comprises an operating rib at the top portion thereof, wherein the locating ribs are bent inwardly while the operating ribs are bent outwardly. Four vertical legs are respectively assembled at four corners of the main body to support the shelf boards therebetween.

In one embodiment, each of the legs is connected to a wheel at a lower end thereof, and a handle is integrally formed between two upper ends of the two legs which are located at the same lateral side of the main body such that the foldable shelf is configured to be used as a cart.

In another embodiment, the four legs of the main body are adapted to directly and firmly stand on the floor.

Comparing with conventional shelf, the present invention is advantageous because: (i) with the connecting members and the V-shaped connecting ribs, each of pairs of the shelf boards can be axially rotatable to fold together between two corresponding connecting pieces which are respectively on the two connecting rods of the main body, and the four legs are assembled at the four corners of the main body to support the shelf boards at the unfolded position, thereby enabling the main body to display between the folded position and the unfolded position; and (ii) the present invention has the operating ribs for a user to hold and pull upwardly at the unfolded position of the main body, and the pairs of the shelf boards can be driven to respectively fold together and the legs at the two lateral sides of the main body are configured to be moved toward each other, thus transforming the main body from the unfolded position into the folded position easily and quickly.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
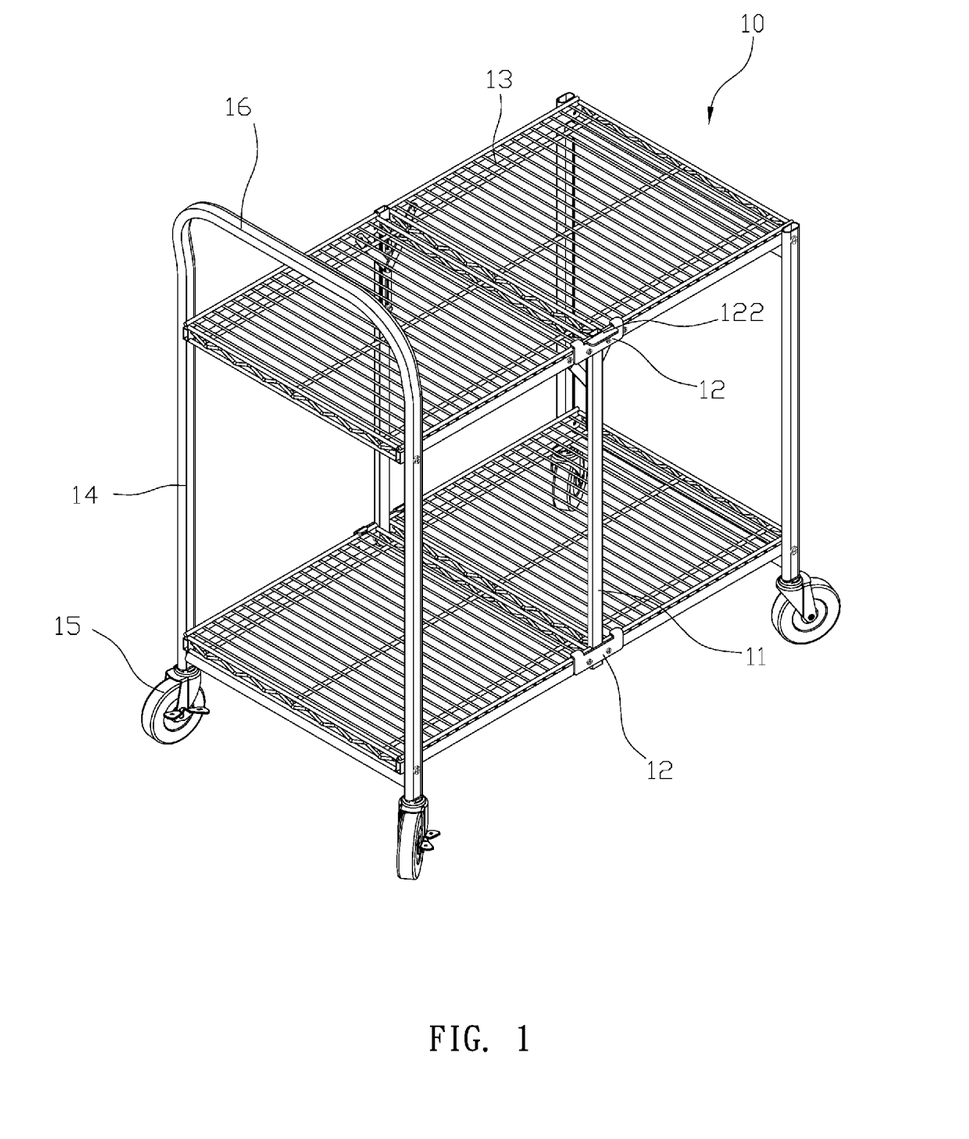
FIG. 1 is a three-dimensional assembly view of a foldable shelf in the present invention.
Figure 2:
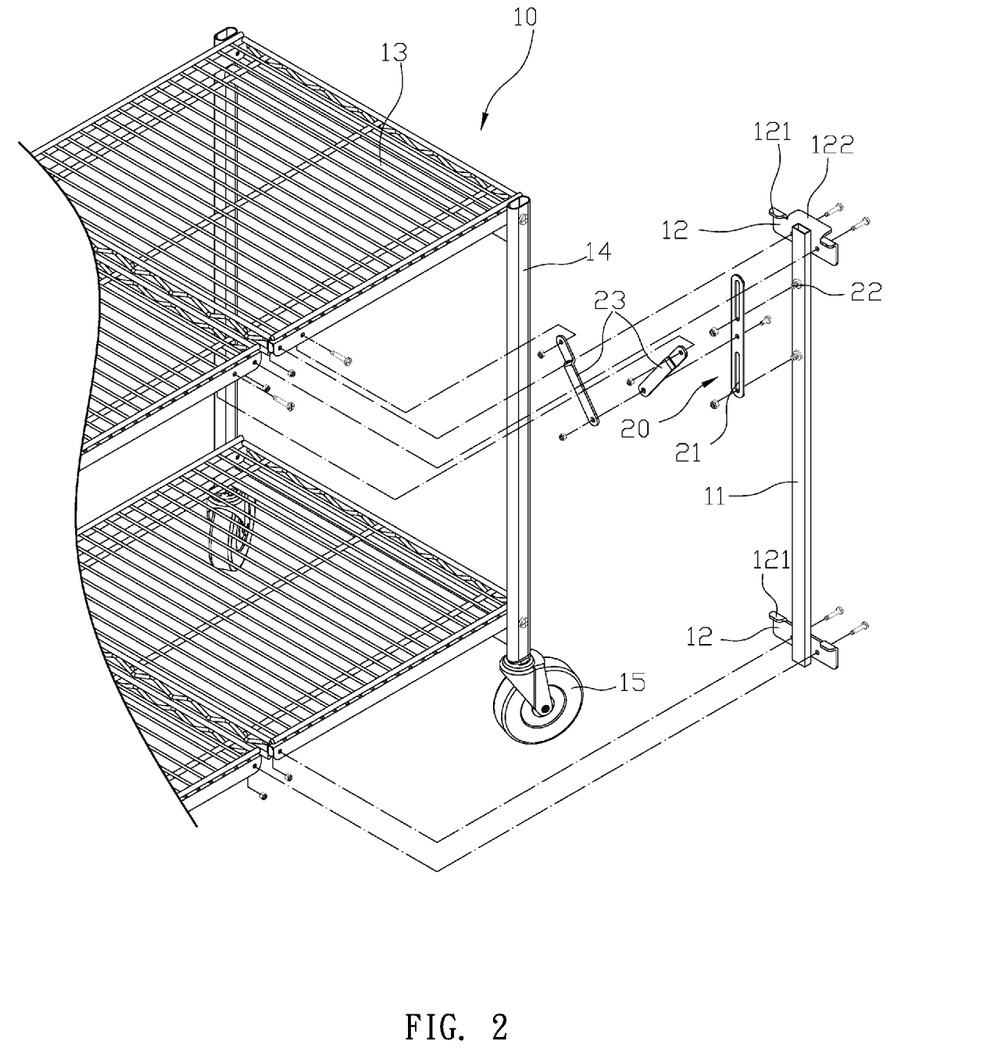
FIG. 2 is an exploded view of the foldable shelf in the present invention.

In order to further understand the goal, characteristics and effect of the present invention, a number of embodiments along with the drawings are illustrated as following:

Referring to FIGS. 1 and 2, the present invention provides a foldable shelf which comprises a main body (10). The main body (10) has two vertical connecting rods (11) respectively located at middle portions of a front side and a rear side of the main body (10) at corresponding positions, and each of the connecting rods (11) has a connecting member (20) coupled on an inner edge thereof. Each of the connecting members (20) has two vertical elongated holes (21) which are configured to respectively cooperate with two lock units (22), wherein the two lock units (22) are configured to be secured on the inner edge of the connecting rod (11), and the two elongated holes (21) are adapted to respectively couple with the two lock units (22), thereby enabling the connecting member (20) to have vertical movements along the inner edge of the connecting rod (11). Furthermore, each of the connecting members (20) is pivotally connected to a V-shaped connecting rib (23), and at least two horizontal connecting pieces (12) are respectively connected to an outer edge of the connecting rod (11). Also, each of the connecting pieces (12) is connected to the connecting rod (11) through a middle portion thereof to evenly position two lateral ends thereof at two lateral sides of the connecting rod (11). The two connecting pieces (12) at the same vertical height on the two different connecting rods (11) are cooperated to assemble a pair of horizontal shelf boards (13) therebetween symmetrically at the two lateral sides of the connecting rods (11), and each of the two shelf boards (13) pivotally coupled with the two connecting pieces (12) at two lateral edges thereof is axially rotatable between the two connecting pieces (12). Each of the two V-shaped connecting ribs (23) is connected to the two uppermost shelf boards (13) respectively at two ends thereof. Moreover, each of the connecting pieces (12) has two locating ribs (121) formed at a top portion thereof, and each of the two uppermost connecting pieces (12) on the two connecting rods (11) further comprises an operating rib (122) at the top portion thereof, wherein the locating ribs (121) are bent inwardly while the operating ribs (122) are bent outwardly. Four vertical legs (14) are respectively assembled at four corners of the main body (10) to support the shelf boards (13) therebetween.

In one embodiment, each of the legs (14) is connected to a wheel (15) at a lower end thereof, and a handle (16) is integrally formed between two upper ends of the two legs (14) which are located at the same lateral side of the main body (10) such that the foldable shelf is configured to be used as a cart.

Figure 3:
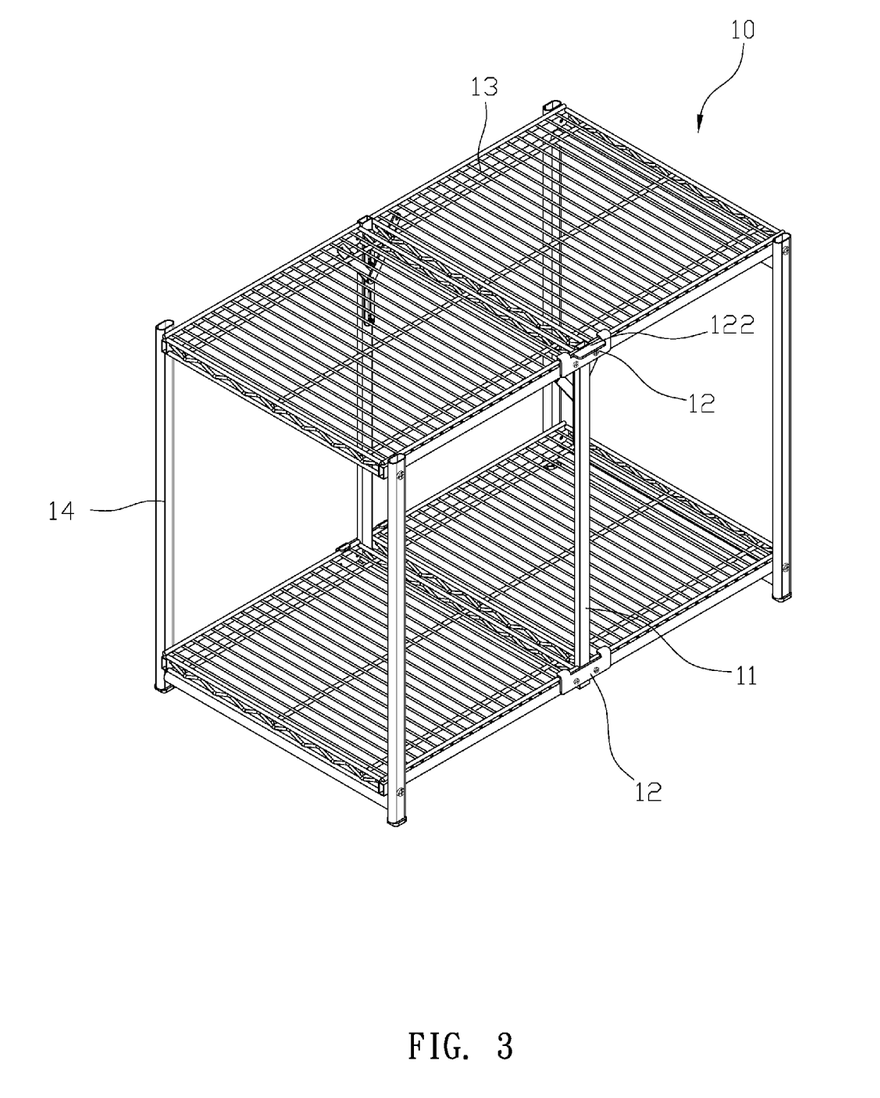
FIG. 3 is a three-dimensional assembly view of another embodiment of the foldable shelf in the present invention.
Figure 4:
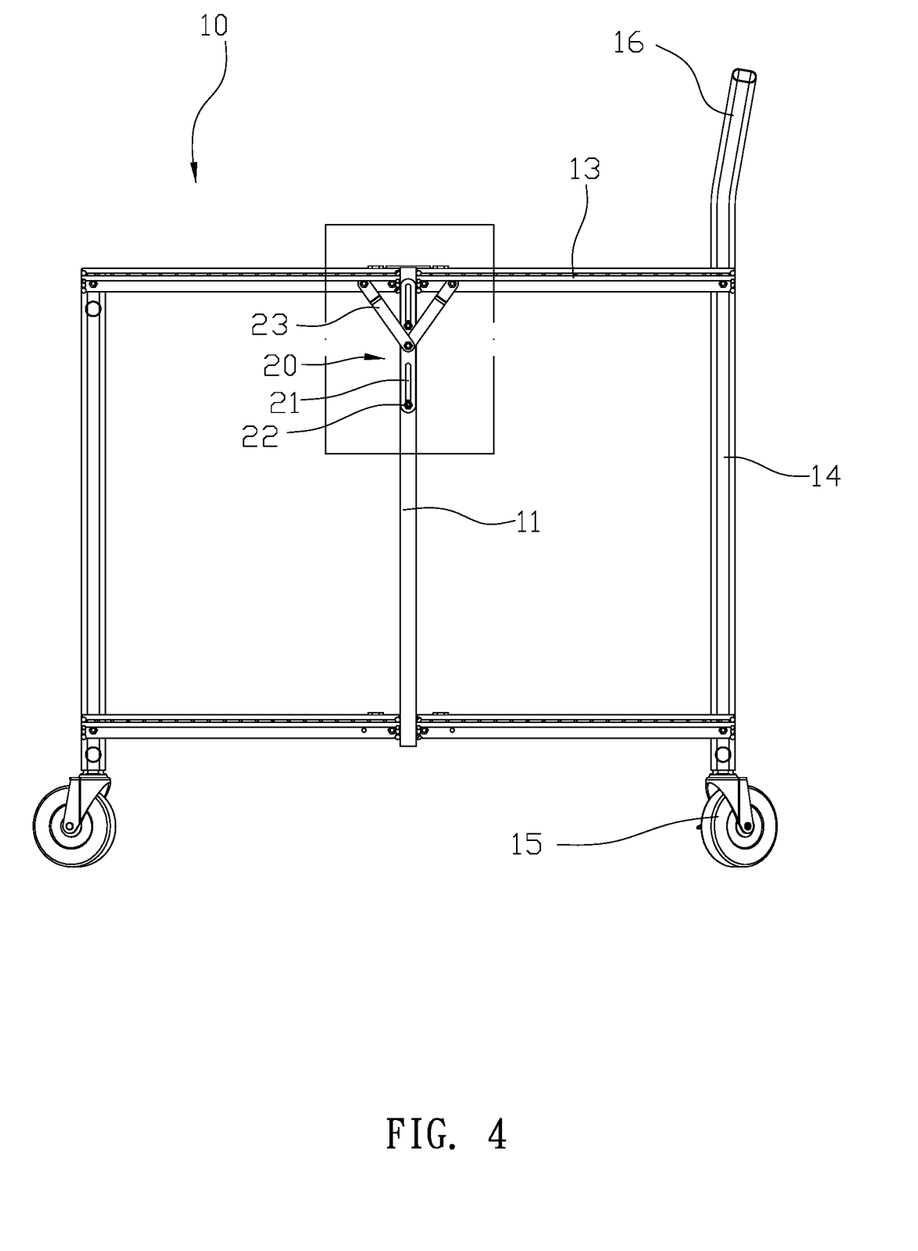
FIG. 4 is a side view of the foldable shelf in the present invention when at an unfolded position.
Figure 5:
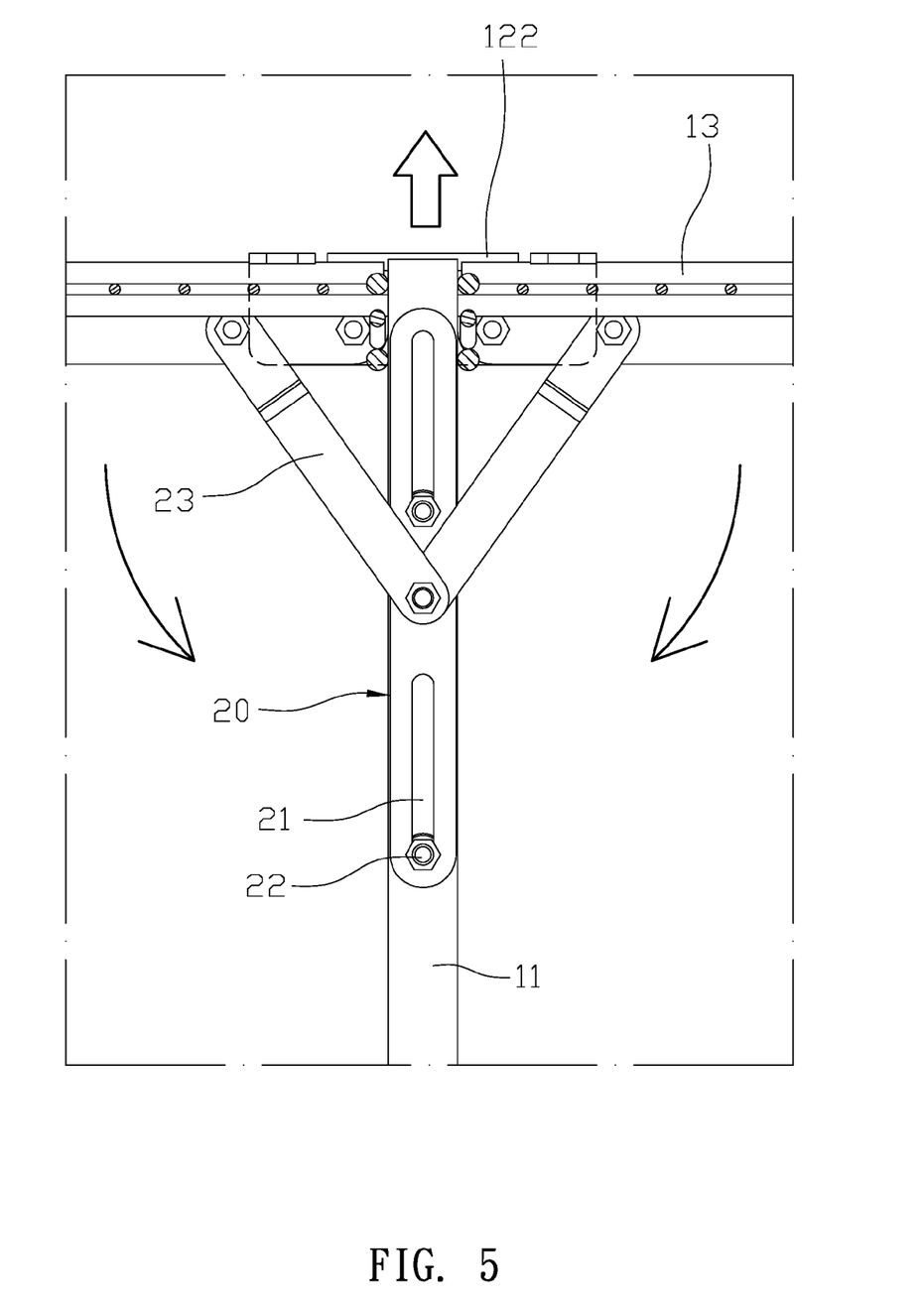
FIG. 5 is a partial enlarged view of the foldable shelf in the present invention when at the unfolded position.
Figure 6:
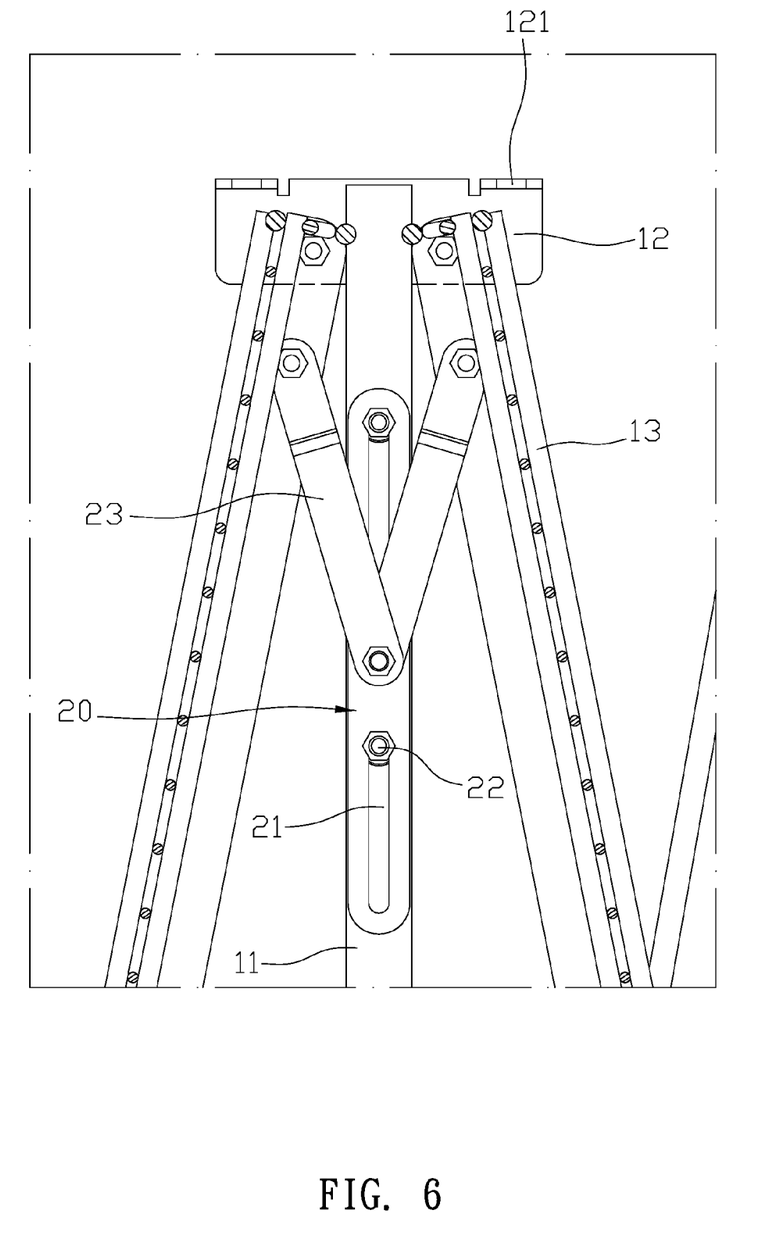
FIG. 6 is a partial enlarged view of the foldable shelf in the present invention when at a folded position.
Figure 7:
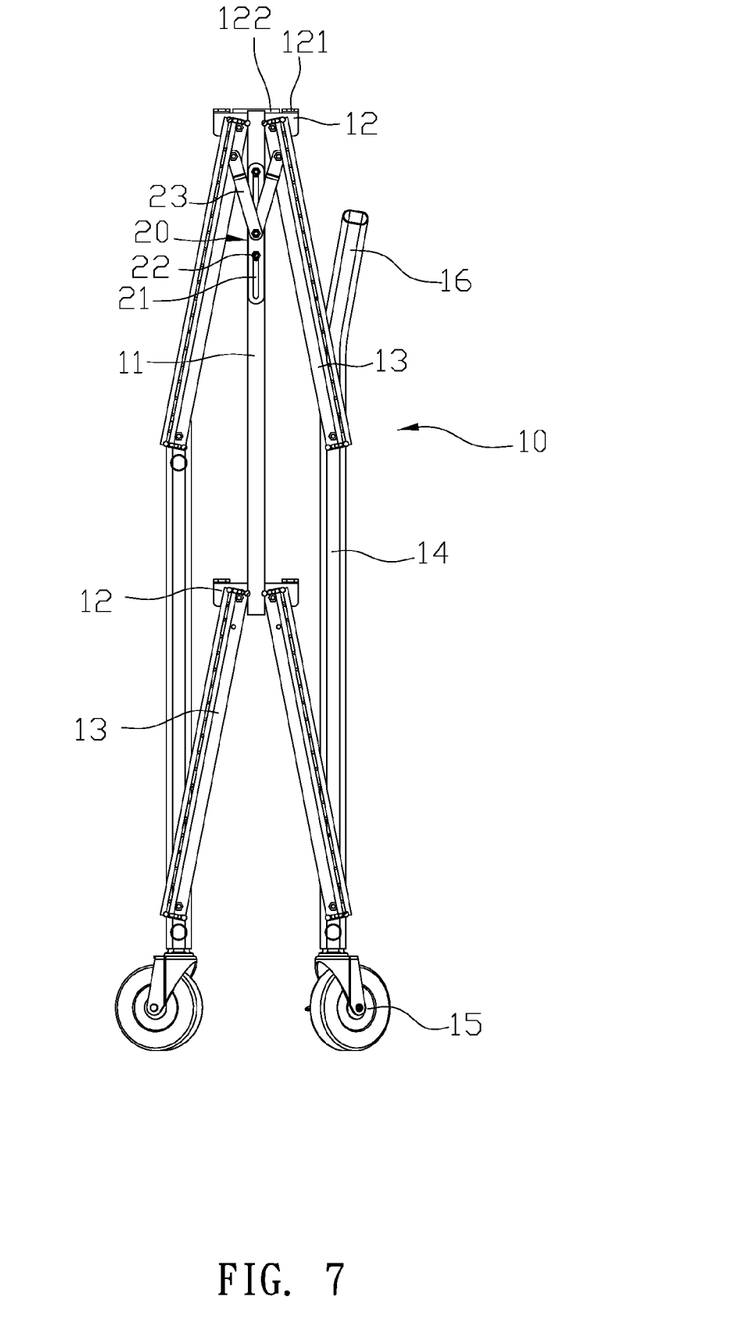
FIG. 7 is a side view of the foldable shelf in the present invention when at the folded position.
Figure 8:
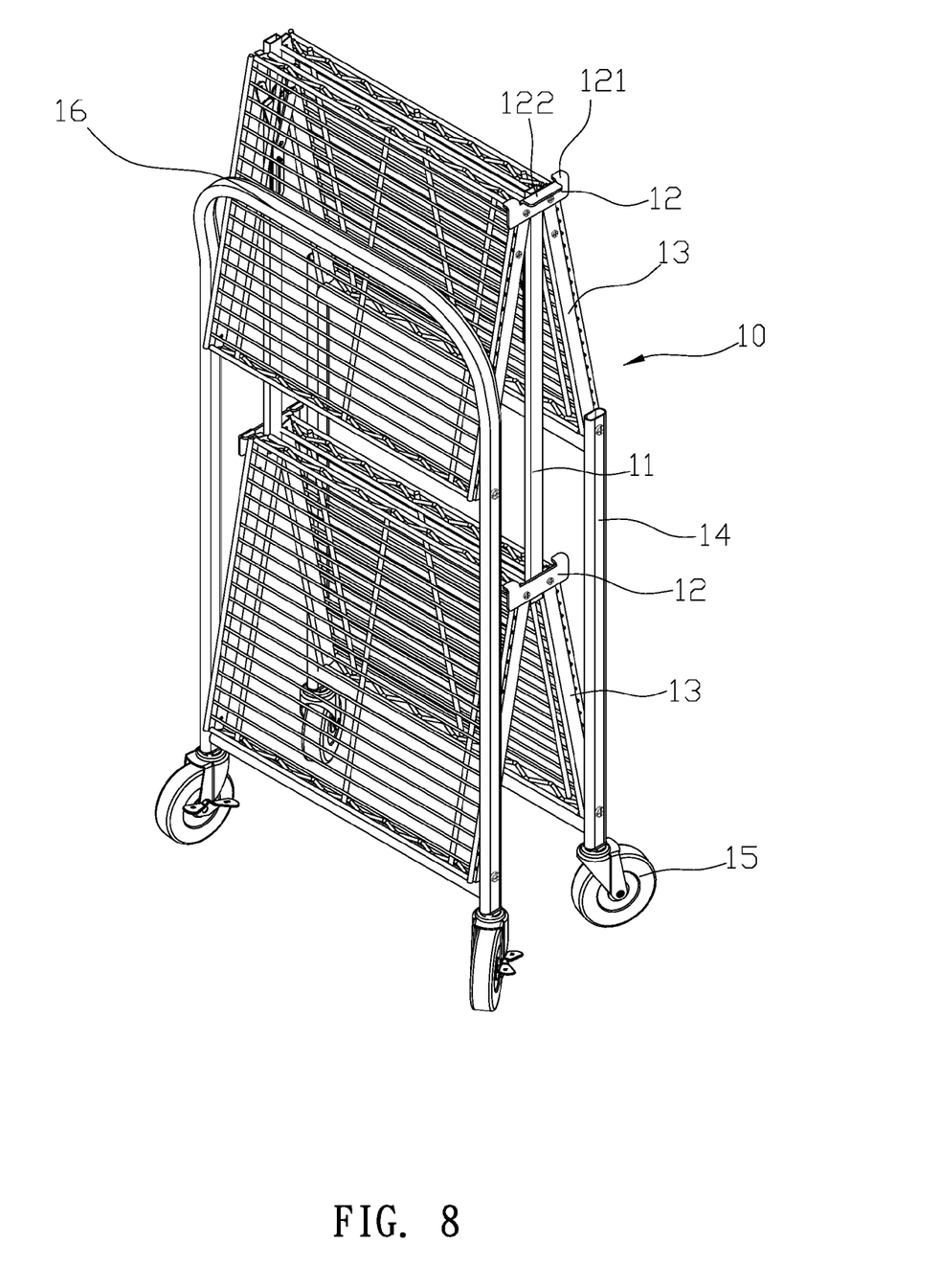
FIG. 8 is a three-dimensional view of the foldable shelf in the present invention when at the folded position.

In another embodiment, referring to FIG. 3, the four legs (14) of the main body (10) are adapted to directly and firmly stand on the floor.

In actual application, referring to FIGS. 1, 2, 4 and 5, when the foldable shelf is at an unfolded position, the two connecting rods (11) and the four legs (14) are vertical and parallel with each other, and each pair of the shelf boards (13) is horizontally coupled between the two connecting rods (11) and the four legs (14) at different heights. Meanwhile, the locating ribs (122) of the connecting pieces (12) are respectively borne against the shelf boards (13) at lower ends thereof, and each of the connecting members (20) is moved upwardly along the inner edge of the connecting rod (11) till each of the lock units (22) is borne against a lower end of the elongated hole (21), thereby enhancing the structural strength of the foldable shelf at the unfolded position.

Conversely, the foldable shelf can be folded into a folded position by following steps, referring to FIGS. 5 to 8, a user can pull the two operating ribs (122) of the uppermost connecting pieces (12) upwardly to release the uppermost pair of the shelf boards (13) from the supports of the four legs (14), and the uppermost pair of the shelf boards (13) can be folded together into the folded position. Meanwhile, the two V-shaped connecting ribs (23) driven by the uppermost shelf boards (13) are configured to drive the two connecting members (20) downwardly till each of the lock units (22) is borne against an upper end of the corresponding elongated hole (21). Moreover, when the two connecting rods (11) are pulled upwardly together with the uppermost connecting pieces (12), the legs (14) at the two lateral sides of the main body (10) are driven to move toward each other, thereby driving lower pair of the shelf boards (13) to be synchronously folded together.

Comparing with conventional shelf, the present invention is advantageous because: (i) with the connecting members (20) and the V-shaped connecting ribs (23), each pair of the shelf boards (13) can be axially rotatable to fold together between two corresponding connecting pieces (12) which are respectively on the two connecting rods (11) of the main body (10), and the four legs (14) are assembled at the four corners of the main body (10) to support the shelf boards (13) at the unfolded position, thereby enabling the main body (10) to display between the folded position and the unfolded position; and (ii) the present invention has the operating ribs (122) for a user to hold and pull upwardly at the unfolded position of the main body (10), and the pairs of the shelf boards (13) can be driven to respectively fold together and the legs (14) at the two lateral sides of the main body (10) are configured to be moved toward each other, thus transforming the main body (10) from the unfolded position into the folded position easily and quickly.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A foldable shelf comprising:
a main body having two vertical connecting rods respectively located at middle portions of a front side and a rear side thereof at corresponding positions, and each of the connecting rods comprising a connecting member coupled on an inner edge thereof; each of the connecting members having two vertical elongated holes which are configured to respectively cooperate with two lock units, wherein the two lock units are configured to be secured on the inner edge of the connecting rod, and the two elongated holes are adapted to respectively couple with the two lock units, thereby enabling the connecting member to have vertical movements along the inner edge of the connecting rod; each of the connecting members pivotally connected to a V-shaped connecting rib, and at least two horizontal connecting pieces respectively connected to an outer edge of the connecting rod, wherein each of the connecting pieces is connected to the connecting rod through a middle portion thereof to evenly position two lateral ends thereof at two lateral sides of the connecting rod; the two connecting pieces, which are at the same vertical height on the two different connecting rods, cooperated to assemble a pair of horizontal shelf boards therebetween symmetrically at the two lateral sides of the connecting rods, and each of the two shelf boards, which is pivotally coupled with the two connecting pieces at two lateral edges thereof, axially rotatable between the two connecting pieces; each of the two V-shaped connecting ribs connected to the two uppermost shelf boards respectively at two ends thereof; each of the connecting pieces having two locating ribs formed at a top portion thereof, and each of the two uppermost connecting pieces on the two connecting rods further comprising an operating rib at the top portion thereof, wherein the locating ribs are bent inwardly while the operating ribs are bent outwardly; and four vertical legs respectively assembled at four corners of the main body to support the shelf boards therebetween.

2. The foldable shelf of claim 1, wherein each of the legs is connected to a wheel at a lower end thereof to enable the foldable shelf to be used as a cart.

3. The foldable shelf of claim 2, wherein a handle is integrally formed between two upper ends of the two legs which are located at the same lateral side of the main body.

* * * * *